March 10, 1953 — H. W. ALDEN — 2,631,071
LUBRICANT SEAL
Filed May 24, 1948
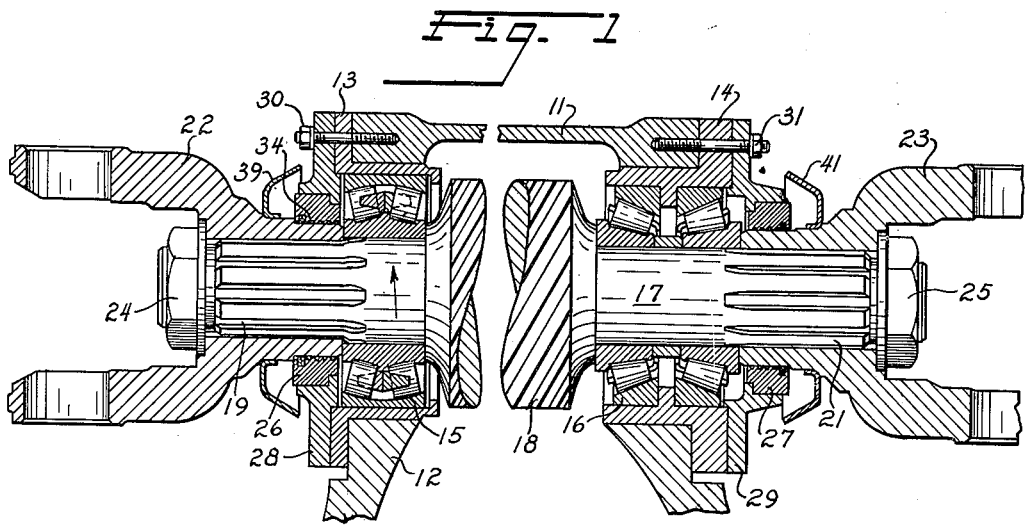
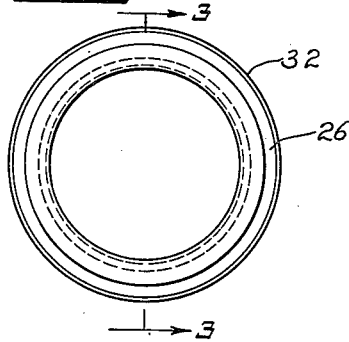
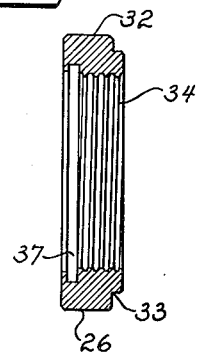
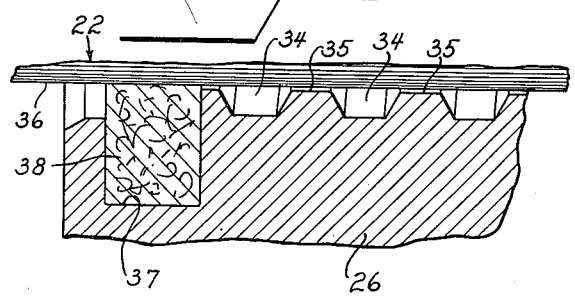
INVENTOR
HERBERT W. ALDEN
Strauch & Hoffman
ATTORNEYS Patented Mar. 10, 1953

2,631,071

UNITED STATES PATENT OFFICE 2,631,071

LUBRICANT SEAL

Herbert W. Alden, Detroit, Mich., assignor to The Timken-Detroit Axle Company, Detroit, Mich., a corporation of Ohio Application May 24, 1948, Serial No. 28,828

1 Claim. (Cl. 308—187.1)

This invention relates to a lubricant seal between a rotating member and a support upon which it is rotatably mounted and is particularly directed to an improved seal of this type which exerts a reverse pumping action on any lubricant tending to escape along the shaft, and is sealed against ingress of dirt and moisture.

The lubricant seal of the present invention is especially adapted for heavy duty vehicles, particularly those wherein lubricant is continuously thrown about within the walls of a casing which encloses part of the rotating member, and it will be described in the environment in which I have found it exceptionally efficient, for sealing one or both ends of a worm drive gear shaft assembly in a heavy duty drive axle. It will be understood that this disposition of the seal is not restrictive of the invention.

It is a major object of my present invention to provide a novel positive type of lubricant seal between a rotating member and a surrounding casing part whereby lubricant tending to escape along the shaft will be positively returned into the casing, and which is sealed against the ingress of dirt, moisture, etc.

It is a further object of my invention to provide a novel lubricant seal device comprising a metal collar adapted to be mounted on a casing in surrounding relation to a relatively rotating member passing through the collar with running clearance, wherein the interior of the collar is directionally grooved so as to pump back into the casing any lubricant that tends to escape outwardly along the surface of the member, and which collar is provided with a sealing device at its outer end that prevents the ingress of dirt, moisture and other foreign material.

Further objects of the invention will appear as the description proceeds in connection with the appended claim and the annexed drawings wherein;

Figure 1 is a fragmentary view, partially in section illustrating a through drive worm shaft mounted in end bearings at the top of an axle housing and having outwardly of each bearing assembly a lubricant seal according to a preferred embodiment of the invention;

Figure 2 is an end elevation of one of the seal units;

Figure 3 is a section taken on the line 3—3 of the seal unit of Figure 2, illustrating its threaded interior; and Figure 4 is an enlarged fragmentary section illustrating the preferred shape and disposition of the threads and the location of the seal ring recess at one end of a seal unit.

Referring to Figure 1, a worm gear carrier indicated at 11 is adapted to be secured across the top of an axle housing part indicated at 12 and is provided at opposite ends with inserted bearing supports 13 and 14 for mounting suitable aligned roller bearing assemblies 15 and 16 respectively. A shaft 17 is rotatably mounted in the bearing assemblies 15 and 16 with the inner races of each of the bearings non-rotatably secured to the shaft where it passes therethrough. Between the bearings 15 and 16, shaft 17 is formed with a worm gear 18 adapted to mesh with and drive a suitable ring gear (not shown) within axle housing 12.

Shaft 17 is splined at its end portions 19 and 21 for non-rotatably receiving the hubs of universal joint coupling members 22 and 23, respectively, that are preferably press-fitted on shaft 17 and held against axial movement by the illustrated nut and washer assemblies at 24 and 25 or other suitable fastening means.

The interior of the axle housing 11 and the worm carrier 12 comprises a casing wherein the moving parts are lubricated by lubricant thrown up from the lower regions of the axle housing by rotation of the ring gear. Some of this lubricant is delivered to bearings 15 and 16 at the ends of the shaft, and the seals of the invention are devised to repel lubricant that tends to escape through the ends of the casing along the shaft.

According to the preferred embodiment of my invention, escape of lubricant outwardly of bearing assemblies 15 and 16 is prevented by the provision of special collars 26 and 27 which are non-rotatably mounted upon carrier end plates 28 and 29 that are suitably secured to carrier 11. Studs 30 and 31 pass through the plates and the bearing supports into the carrier to hold all in rigid assembly.

Collar 26 illustrated at the left in Figure 1 and in Figure 3, comprises an annular metal member having an external cylindrical peripheral surface 32 by which it is press fitted tightly into a surrounding opening in plate 28. Collar 26 is formed with a locating shoulder 33 adapted to abut against a coacting flat shoulder on plate 28 when the collar is in place. Collar 26 may be of any suitable metal, such as cast iron, aluminum, bronze or the like. Internally, collar 26 is formed with a spiral flat-bottomed groove threaded along the major portion of its bore, this spiral groove 34 being of relatively small pitch so as to secure an adequate number of turns within the relatively short length of the collar. Preferably the groove has a pitch of about six threads to the inch. Between adjacent turns of the groove are flat lands indicated best at 35 in Figure 4.

In the illustrated embodiment, the relatively flat lands 35 lie in a cylindrical envelope that closely surrounds with running clearance the cylindrical periphery 36 of the hub of coupling 22 which is rigid with shaft 17. The invention would, of course, be the same if surface 36 were directly on shaft 17 or some other part rigid with it. Preferably the groove and land formation is obtained by cutting the bore of collar 26 with an Acme thread or a square thread of the required pitch, an Acme type thread being illustrated. The internal bore of collar 26 is carefully dimensioned so that it has a radial running clearance of about ten thousandth of an inch (.010 inch) with the adjacent surface of the coupling hub.

At its outer end, collar 26 is formed with a rectangular bottomed continuous annular recess 37 which is adapted to receive a felt or other flexible fibrous sealing ring or packing 38 that is non-rotatably secured within the recess and is adapted during operation to wipingly engage surface 36.

In practice, on a three inch diameter hub, I have found a collar of about 4.25 inches outside diameter with an overall length of about 1⅜ inch and with a groove 34 of six threads to the inch to be satisfactory. Recess 37 is preferably much deeper than groove 34, being about ⅜ of an inch in depth and about 1/16 inch in width. These dimensions may of course be varied to suit any particular problem or construction.

A similar collar 27 at the other end of the shaft is press fitted into plate 29 in surrounding relation to the adjacent cylindrical peripheral surface of universal joint coupling member 23 and is similarly internally grooved and provided with a felt or like sealing ring within a recess formed near its outer edge.

Thus collars 26 and 27 are substantially identical and identically mounted, but with the important difference that the threads or grooves 34 in the respective collars are oppositely disposed. For example, assuming that shaft 17 of Figure 1 is normally rotated in the direction of the arrow, the threads in collar 26 at the left side of the shaft would be right hand threads and the threads on collar 27 at the right hand end of the shaft would be left hand threads. In operation, therefore, any lubricant tending to escape outwardly along surface 36 to the left of bearing 15 would encounter an opposed pumping action from the groove 34 of collar 26 which would tend to return the bulk of such lubricant within the casing. This is a positive action which opposes the lubricant pressure developed within the casing. Felt ring 38, besides intercepting any lubricant that might possibly escape through the clearance space between collar 26 and hub surface 36, also serves the desirable purpose of preventing the ingress of dust, dirt and moisture and any objectionable foreign matter from the atmosphere, thereby improving the efficiency of the bearings and preventing the lubricant within the casing from becoming dirty or emulsified.

Collar 27 similarly coacts with the adjacent hub portion of member 23.

Adjacent the outer end of lubricant seal collars 26 and 27 are annular, cup-shaped sheet metal baffles 39 and 41 that face and shield the exposed ends of the collars from dirt and water and also serve as oil slingers should lubricant eventually escape through the collars. Baffles 39 and 41 are preferably press fitted tightly onto coupling members 22 and 23.

I have tested several of these seals and found them far superior to seals such as those shown in Morgan Patent 2,043,006 hitherto used in such places. The seals of the invention have run thousands of miles while maintaining the exterior of the axle casing absolutely dry.

The invention may be embodied in other specific forms without departing from the spirit or essential characteristics thereof. The present embodiments are therefore to be considered in all respects as illustrative and not restrictive, the scope of the invention being indicated by the appended claim rather than by the foregoing description, and all changes which come within the meaning and range of equivalency of the claim are therefore intended to be embraced therein.

What is claimed and desired to be secured by United States Letters Patent is:

In a drive assembly, a casing, a rotatable member projecting from a side of said casing, a bearing rotatably supporting said member within said casing, said casing containing provision for bearing lubrication therein, a bearing support having an annular flange removably attached to said casing, a sealing assembly for preventing escape of lubricant outwardly of said bearing along said rotatable member comprising an end carrier plate having a flange removably secured to the flange on said bearing support and to said casing, a relatively short collar press fitted in said carrier, said collar and said carrier plate having oppositely directed mutually engageable shoulders for locating said collar axially with respect to said carrier, said collar having an internal bore closely surrounding a cylindrical surface on said rotatable member where the latter projects from said casing, an annular groove formed within said bore spaced from the ends of said collar, an internal spiral groove formed within said bore between said annular groove and the inner end of said collar, the lands between said groove being flat and forming a cylindrical envelope closely surrounding said surface, said spiral groove being of such inclination relative to the normal rotation of said member as to oppose outward movement of lubricant along said member, and an annulus of soft material mounted within said annular groove in wiping engagement with said member for preventing the ingress of dirt and moisture along said member.

HERBERT W. ALDEN.

REFERENCES CITED

The following references are of record in the file of this patent:

UNITED STATES PATENTS

| Number | Name | Date |
|---|---|---|
| 752,170 | Krogh | Feb. 16, 1904 |
| 924,897 | Emmet | June 15, 1909 |
| 1,830,186 | Barley | Nov. 3, 1931 |
| 1,991,614 | Jonn | Feb. 19, 1935 |
| 2,043,006 | Morgan | June 2, 1936 |